No. 663,090. Patented Dec. 4, 1900.
C. W. & J. F. PIKE.
TARGET THROWING APPARATUS.
(Application filed May 29, 1900.)
(No Model.)

WITNESSES:
Ella L. Giles
Clara K. Frohlach

INVENTORS.
Cornelius Washington Pike
John Franklin Pike
BY
Richardson
ATTORNEYS

UNITED STATES PATENT OFFICE.

CORNELIUS WASHINGTON PIKE AND JOHN FRANKLIN PIKE, OF BIRMINGHAM, ENGLAND.

TARGET-THROWING APPARATUS.

SPECIFICATION forming part of Letters Patent No. 663,090, dated December 4, 1900.

Application filed May 29, 1900. Serial No. 18,457. (No model.)

*To all whom it may concern:*

Be it known that we, CORNELIUS WASHINGTON PIKE and JOHN FRANKLIN PIKE, subjects of the Queen of Great Britain, residing at 34 Moor street, Birmingham, in the county of Warwick, England, have invented a certain new and useful Apparatus for Throwing "Inanimate Birds" for Shooting Practice, of which the following is a specification.

This invention relates to a holder or clip combined with a handle for the purpose of throwing inanimate birds by hand. It is constructed by one or more pieces of metal wire or rod of round, square, or other section so bent as to form a spring-clip or "hand" for holding the bird and also bent to form a loop or loops for attachment to the handle, which consists of a short rod of wood, cane, metal, or other suitable material, with a rivet or bolt and nut at one end to pass through the loops of the wire for attaching it to the handle, or the wire may be attached to the handle by screwing or fixing it into a ferrule at the end of the handle.

By forming the loops as a coil tightly gripped by the handle the spring-clip or holder is capable of being turned to any desired angle relative to the handle, one advantage of which is to vary the flight of the "bird." The grip on the bird is obtained by the pressure exerted by the wire when the bird has been placed between the bent portions.

Figure 1:
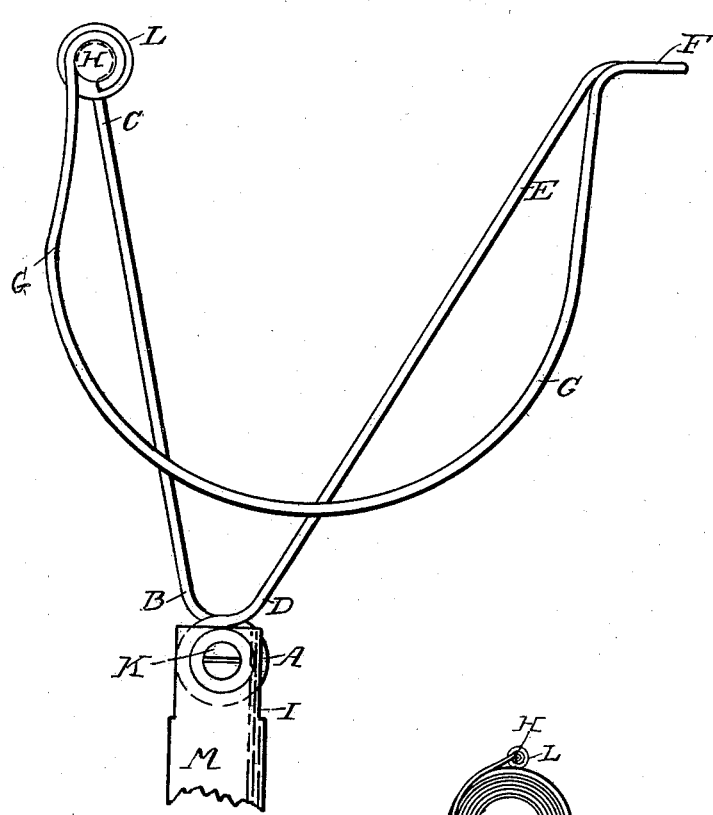
Figure 2:
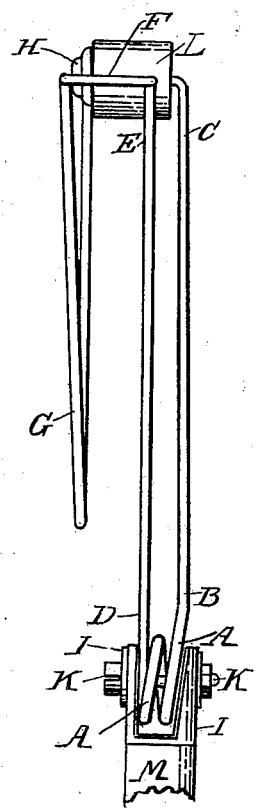
Figure 3:
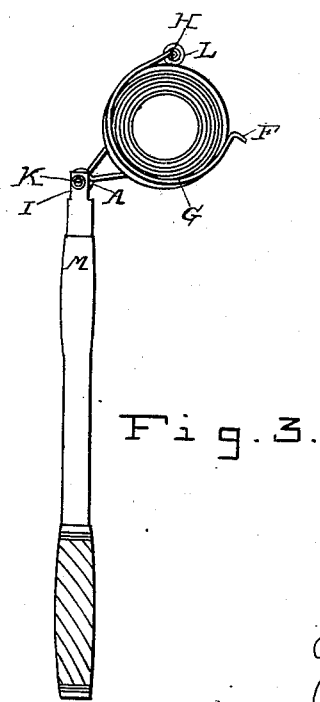

Referring to the accompanying sheet of drawings, which form a part of this specification and illustrates a convenient form of constructing our improved apparatus, Figure 1 is a front view of the holder or spring-clip drawn full size. Fig. 2 is a side view of same; and Fig. 3 is a view of the complete apparatus holding an inanimate bird, drawn one-quarter full size.

In the illustrations the holder or spring-clip is shown constructed of one piece of bent wire. The wire is bent into loops or coils at A, leaving the portions from B to C and D to E as straight arms, one end being then bent over at F and twisted into the bow-shaped clip G, the two ends of the wire being then attached by the rivet H passing through the rubber roller L or otherwise attached. The coils or loops A are placed in and gripped by the fork I at the end of the rod M and held there by the bolt and nut K passing through the loops and acting as a pivot to the wire holder, which may be turned to any required angle, as shown in Fig. 3, or retained rigid by tightening the pressure of the nut. The inanimate bird is then placed against the rubber roller L and, being rolled into position between the arms B C D E and the bow G, is held in position, as shown in Fig. 3, by the grip exerted by the pressure of the wire upon it. To throw the bird, the handle is grasped, and by a throwing action the bird is released and caused to travel in a similar way as from an ordinary trap.

We do not confine ourselves to any particular form of holder to grip the bird, and when constructed of wire the wire may be bent in any desired manner to form a spring-grip, and we may in some instances apply an additional spring or springs to assist in holding or releasing the bird; but we prefer constructing it as described in the above specification.

Having now described our invention, what we claim as new, and desire to secure by Letters Patent, is—

1. In combination with a suitable handle, a spring-grip comprising a wire having a portion coiled upon itself and secured to said handle, and having outwardly-diverging straight arms, and a U-shaped bent portion extending between said arms, substantially as described.

2. In combination with a suitable handle, a grip comprising a single piece of wire coiled upon itself with said coil secured to said handle, the wire diverging outwardly from said coil to form straight arms, an angular bent portion at the extremity of one of the arms, a loop formed at the extremity of the other arm, the wire from the extremity of the loop being extended across in a U-shaped bend to the extremity of the angular bent portion around which it is twisted, and a roller journaled on said angular bent portion, substantially as described.

In witness whereof we have hereunto set our hands in presence of two witnesses.

CORNELIUS WASHINGTON PIKE.
   JOHN FRANKLIN PIKE.

Witnesses:
 HENRY F. TALBOT,
 W. BERNARD CURRALL.